(12) United States Patent
Yong et al.

(10) Patent No.: US 11,519,995 B1
(45) Date of Patent: Dec. 6, 2022

(54) RANGE-FINDING METHOD, RANGE-FINDING APPARATUS, TERMINAL SYSTEM, AND COMPUTER-READABLE STORAGE MEDIUM

(71) Applicant: Shenzhen Reolink Technology Co., Ltd., Shenzhen (CN)

(72) Inventors: Sheng Yong, Shenzhen (CN); Rui Zhou, Shenzhen (CN); Xiaoyu Liu, Shenzhen (CN); Yulong Que, Shenzhen (CN)

(73) Assignee: Shenzhen Reolink Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/692,098

(22) Filed: Mar. 10, 2022

(30) Foreign Application Priority Data

Sep. 17, 2021 (CN) .......................... 202111094518.2

(51) Int. Cl.
*G01S 1/04* (2006.01)
(52) U.S. Cl.
CPC ............ *G01S 1/0428* (2019.08); *G01S 1/045* (2013.01)
(58) Field of Classification Search
CPC ............................... G01S 1/0428; G01S 1/045
See application file for complete search history.

(56) References Cited

U.S. PATENT DOCUMENTS

2020/0284883 A1* 9/2020 Ferreira ................ G01S 7/4817

* cited by examiner

*Primary Examiner* — Diane D Mizrahi
(74) *Attorney, Agent, or Firm* — Idea Intellectual Limited; Margaret A. Burke; Sam T. Yip

(57) ABSTRACT

A range-finding method, a apparatus, a terminal system, and a computer-readable storage medium are provided. The range-finding method includes: transmitting a first check code from a transmitting terminal to a receiving terminal by using a first communication technology; transmitting a modulated signal from the transmitting terminal to the receiving terminal by using a second communication technology different from the first communication technology, where the modulated signal carries a second check code; acquiring a first moment at which the modulated signal is transmitted and a second moment at which the modulated signal is received; demodulating the second check code in the modulated signal; acquiring a range-finding confidence according to the first check code and the demodulated second check code; and acquiring a measured distance between the transmitting terminal and the receiving terminal according to the first moment, the second moment, a transmission speed of the modulated signal, and the range-finding confidence.

22 Claims, 10 Drawing Sheets

| Transmitting terminal time | Transmitting terminal event | Receiving terminal time before synchronization | Receiving terminal time after synchronization | Receiving terminal event |
|---|---|---|---|---|
| 10:00:00 | Recording a time stamp T0 Transmitting a first check code and the time stamp T0 | 10:00:02 | / | None |
| 10:00:01 | Transmitting a modulated signal | 10:00:03 | 10:00:01 | Receiving the first check code and the time stamp T0 Synchronizing clock information Recording a time stamp T1 |
| 10:00:11 | None | 10:00:13 | 10:00:11 | Receiving the modulated signal Recording a time stamp T2 |

FIG. 9

| Transmitting terminal time | Transmitting terminal event | Receiving terminal time before synchronization | Receiving terminal time after synchronization | Receiving terminal event |
|---|---|---|---|---|
| 10:00:00 | Recording a time stamp T0 Transmitting a first check code and the time stamp T0 Transmitting a modulated signal | 10:00:02 | 10:00:00 | Receiving the first check code and the time stamp T0 Synchronizing clock information Recording a time stamp T1 |
| 10:00:10 | None | 10:00:12 | 10:00:10 | Receiving the modulated signal Recording a time stamp T2 |

FIG. 10

| Check table | |
|---|---|
| First check code | Second check code |
| 00001001 | 00000110 |
| 00001101 | 00000010 |

RANGE-FINDING METHOD, RANGE-FINDING APPARATUS, TERMINAL SYSTEM, AND COMPUTER-READABLE STORAGE MEDIUM

FIELD OF THE INVENTION

This application relates to the field of range-finding, and more specifically, to a range-finding method, a range-finding apparatus, a terminal system, and a non-transitory computer-readable storage medium.

BACKGROUND OF THE INVENTION

At present, most range-finding methods are performed based on a transceiver integrated module. That is to say, after a detection signal is transmitted, a signal reflected by an object is detected. A time spent by the signal to go back and forth is calculated according to a time difference between transmitting and receiving of the signal, thereby realizing a range-finding function. Since the reflected signal is greatly affected by a reflective material, it is often difficult to accurately identify the received signal. In particular, when the detection signal is transmitted at an excessively large field angle, the transmitted signal is excessively dispersive. As a result, signal power attenuates faster with the increase of distance, measurable range is too small, and it is difficult to be distinguished from interference signal. In addition, in the reflection-based range-finding method, since the detection signal is required to go back and forth between a transmitting terminal and a to-be-detected object, the measurement frequency decreases significantly with increase of measured distance.

SUMMARY OF THE INVENTION

Implementations of this application provides a range-finding method, a range-finding apparatus, a terminal system, and a non-transitory computer-readable storage medium.

The range-finding method in the implementations of this application includes: transmitting a first check code from a transmitting terminal to a receiving terminal by using a first communication technology; transmitting a modulated signal from the transmitting terminal to the receiving terminal by using a second communication technology, where the modulated signal carries a second check code, and the first communication technology is different from the second communication technology; acquiring a first moment at which the transmitting terminal transmits the modulated signal and a second moment at which the receiving terminal receives the modulated signal; demodulating the second check code in the modulated signal; acquiring a range-finding confidence according to the first check code and the demodulated second check code; and acquiring a measured distance between the transmitting terminal and the receiving terminal according to the first moment, the second moment, a transmission speed of the modulated signal, and the range-finding confidence.

The range-finding apparatus in the implementations of this application includes a transmitting module, an acquisition module, a demodulation module, a confidence module, and a calculation module. The transmitting module is configured to transmit a first check code from a transmitting terminal to a receiving terminal by using a first communication technology. The transmitting module is further configured to transmit a modulated signal from the transmitting terminal to the receiving terminal by using a second communication technology, where the modulated signal carries a second check code, and the first communication technology is different from the second communication technology. The acquisition module is configured to acquire a first moment at which the transmitting terminal transmits the modulated signal and a second moment at which the receiving terminal receives the modulated signal. The demodulation module is configured to demodulate the second check code in the modulated signal. The confidence module is configured to acquire a range-finding confidence according to the first check code and the demodulated second check code. The calculation module is configured to acquire a measured distance between the transmitting terminal and the receiving terminal according to the first moment, the second moment, a transmission speed of the modulated signal, and the range-finding confidence.

The terminal system in the implementations of this application includes a transmitting terminal, a receiving terminal, one or more processors, a memory, and one or more programs. The one or more programs are stored in the memory and are executable by the one or more processors. The programs include instructions for performing the following operations: transmitting a first check code from a transmitting terminal to a receiving terminal by using a first communication technology; transmitting a modulated signal from the transmitting terminal to the receiving terminal by using a second communication technology, where the modulated signal carries a second check code, and the first communication technology is different from the second communication technology; acquiring a first moment at which the transmitting terminal transmits the modulated signal and a second moment at which the receiving terminal receives the modulated signal; demodulating the second check code in the modulated signal; acquiring a range-finding confidence according to the first check code and the demodulated second check code; and acquiring a measured distance between the transmitting terminal and the receiving terminal according to the first moment, the second moment, a transmission speed of the modulated signal, and the range-finding confidence.

The non-transitory computer-readable storage medium in the implementations of this application includes a computer program which, when executed by one or more processors, causes the one or more processors to perform the following range-finding method: transmitting a first check code from a transmitting terminal to a receiving terminal by using a first communication technology; transmitting a modulated signal from the transmitting terminal to the receiving terminal by using a second communication technology, where the modulated signal carries a second check code, and the first communication technology is different from the second communication technology; acquiring a first moment at which the transmitting terminal transmits the modulated signal and a second moment at which the receiving terminal receives the modulated signal; demodulating the second check code in the modulated signal; acquiring a range-finding confidence according to the first check code and the demodulated second check code; and acquiring a measured distance between the transmitting terminal and the receiving terminal according to the first moment, the second moment, a transmission speed of the modulated signal, and the range-finding confidence.

By implementing the range-finding method, the range-finding apparatus, the terminal system, and the non-transitory computer-readable storage medium in this application, the measured distance between the transmitting terminal and the receiving terminal can be acquired without a need to return the modulated signal to the transmitting terminal. Compared with a reflective range-finding method, the range-finding method in this application has a higher measurement frequency when used for measuring a same distance. By means of the range-finding method in this application, more measurement data can be acquired over a same time, and data with low reliability such as error data, interference data, and abnormal data can be more easily identified from the measurement data.

Additional aspects and advantages of the implementations of this application will be given in the following descriptions, some of which will become apparent from the following descriptions or may be learned through practices of the implementations of this application.

BRIEF DESCRIPTION OF THE DRAWINGS

The foregoing and/or additional aspects and advantages of this application will become apparent and comprehensible from the descriptions of the implementations below with reference to the accompanying drawings.

FIG. 9 is a schematic diagram of an event-time table of the range-finding method according to some implementations of this application.

FIG. 10 is a schematic diagram of an event-time table of the range-finding method according to some implementations of this application.

DETAILED DESCRIPTION

The following describes implementations of this application in detail. Examples of the implementations are shown in the accompanying drawings, and same or similar reference signs in all the accompanying drawings indicate same or similar components or components having same or similar functions. The implementations described below with reference to the accompanying drawings are exemplary, and are intended to explain the implementations of this application and cannot be construed as limitations on the implementations of this application.

Figure 1:
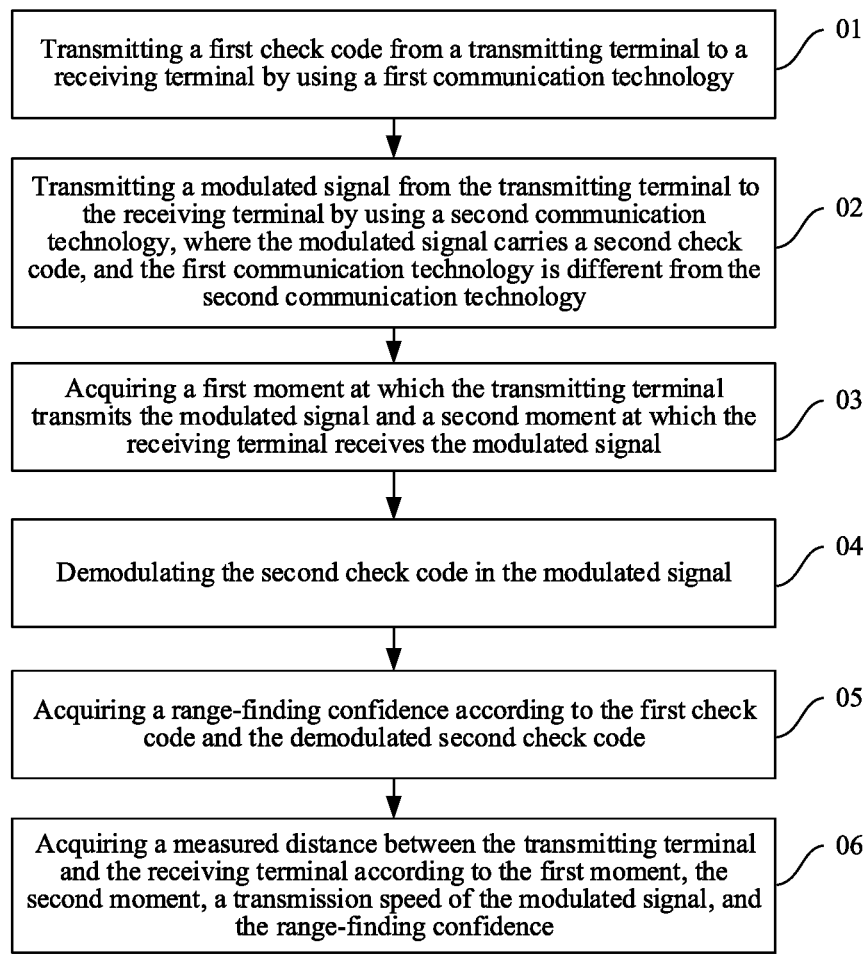
FIG. 1 is a schematic flowchart of a range-finding method according to some implementations of this application.
Figure 2:
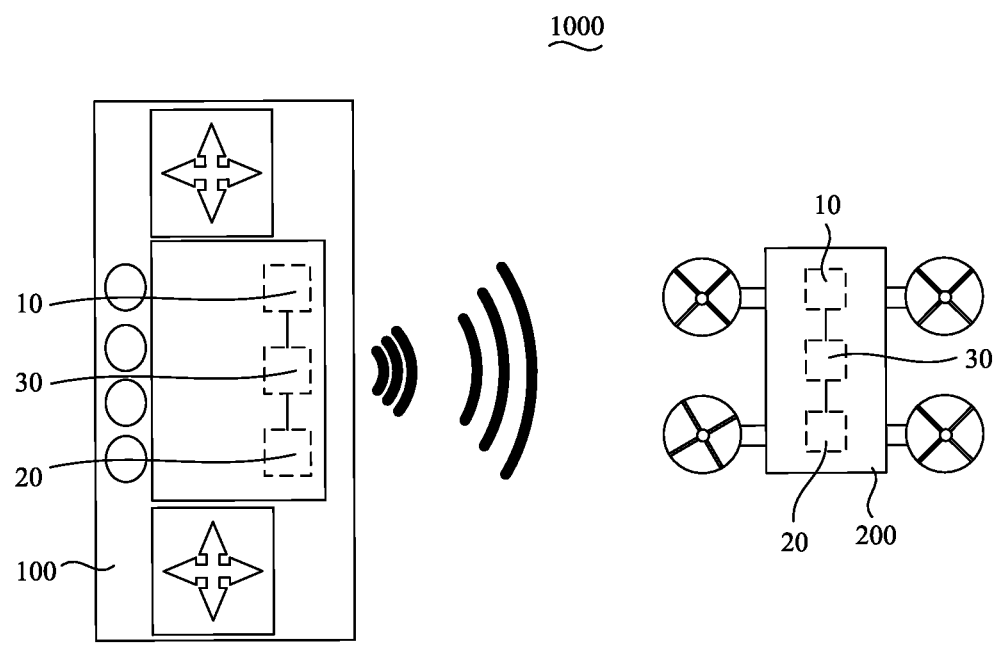
FIG. 2 is a schematic structural diagram of a terminal system according to some implementations of this application.
Figure 3:
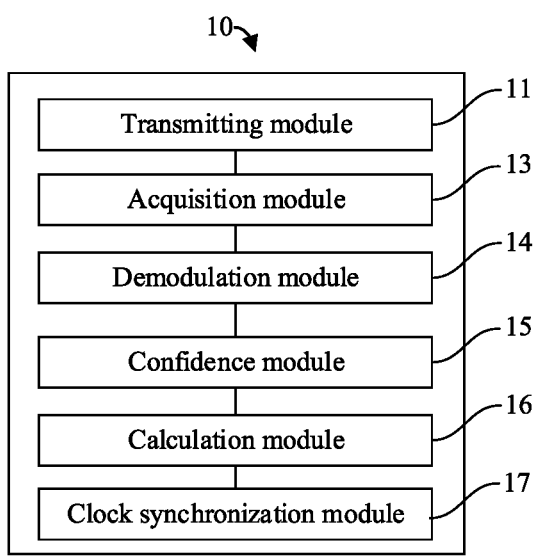
FIG. 3 is a schematic structural diagram of a range-finding apparatus according to some implementations of this application.

Referring to FIG. 1 to FIG. 3, an implementation of this application provides a range-finding method. The range-finding method includes the following steps:

01: Transmitting a first check code from a transmitting terminal 100 to a receiving terminal 200 by using a first communication technology.

02: Transmitting a modulated signal from the transmitting terminal 100 to the receiving terminal 200 by using a second communication technology, where the modulated signal carries a second check code, and the first communication technology is different from the second communication technology.

03: Acquiring a first moment at which the transmitting terminal 100 transmits the modulated signal and a second moment at which the receiving terminal 200 receives the modulated signal.

04: Demodulating the second check code in the modulated signal.

05: Acquiring a range-finding confidence according to the first check code and the demodulated second check code.

06: Acquiring a measured distance between the transmitting terminal 100 and the receiving terminal 200 according to the first moment, the second moment, a transmission speed of the modulated signal, and the range-finding confidence.

Referring to FIG. 2, an implementation of this application further provides a terminal system 1000. The terminal system 1000 includes a transmitting terminal 100, a receiving terminal 200, one or more processors 30, a memory 20, and one or more programs. The transmitting terminal 100 can transmit a first check code to the receiving terminal 200 and transmit a modulated signal to the receiving terminal 200, so as to acquire a measured distance between the transmitting terminal 100 and the receiving terminal 200. In an embodiment, the transmitting terminal 100 and the receiving terminal 200 may be a remote control device and a movable platform, respectively. For example, the transmitting terminal 100 is a remote controller, and the receiving terminal 200 is an unmanned aerial vehicle (UAV), an unmanned vehicle, an intelligent robot, or the line, which is not listed herein. In another embodiment, the transmitting terminal 100 and the receiving terminal 200 may be a signal station and the movable platform respectively. For example, the transmitting terminal 100 is a base station, and the receiving terminal 200 is a UAV. In another example, the transmitting terminal 100 is a charging station of a sweeping robot, and the receiving terminal 200 is the sweeping robot. In another example, the transmitting terminal 100 is a parking navigator in a parking lot, and the receiving terminal 200 is a vehicle. In still another embodiment, the transmitting terminal 100 and the receiving terminal 200 may be an electronic device and a beacon respectively. For example, the transmitting terminal 100 is an electronic device such as a mobile phone, a camera, a smart watch, or a head-mounted display device, and the receiving terminal 200 is a calibration board. Based on the above embodiments, the transmitting terminal 100 and the receiving terminal 200 each may be a fixed object or a movable object. In the above embodiment, an object used as the transmitting terminal 100 may alternatively be used as the receiving terminal 200, and an object used as the receiving terminal 200 may alternatively be used as the transmitting terminal 100. For example, in an embodiment, the transmitting terminal 100 is a UAV, an unmanned vehicle, an intelligent robot, or the like, and the receiving terminal 200 is a remote controller or a receiving apparatus of the UAV, the unmanned vehicle, or the intelligent robot. The receiving apparatus is configured to provide supply, detection, maintenance, and the like to the UAV, the unmanned vehicle, or the intelligent robot. It should be noted that the types of the transmitting terminal 100 and the receiving terminal 200 in the implementation of this application are not limited to the types listed in the above embodiment, and are not limited herein.

The processors 30 may be disposed at the transmitting terminal 100, or may be disposed at the receiving terminal 200, or may be disposed on both the transmitting terminal 100 and the receiving terminal 200, which is not limited herein. The one or more programs are stored in the memory 20 and are executable by the one or more processors 30. The programs include instructions for performing the above range-finding steps 01, 02, 03, 04, 05 and 06. The processors 30 may be configured to perform the steps 01, 02, 03, 04, 05 and 06. That is to say, the processor 30 may be configured to transmit the first check code from the transmitting terminal 100 to the receiving terminal 200 by using the first communication technology; transmit the modulated signal from the transmitting terminal 100 to the receiving terminal 200 by using the second communication technology, where the modulated signal carries the second check code; acquire the first moment at which the transmitting terminal 100 transmits the modulated signal and the second moment at which the receiving terminal 200 receives the modulated signal; demodulate the second check code in the modulated signal; acquire the range-finding confidence according to the first check code and the demodulated second check code; and acquire the measured distance between the transmitting terminal 100 and the receiving terminal 200 according to the first moment, the second moment, the transmission speed of the modulated signal, and the range-finding confidence.

Referring to FIG. 3, an implementation of this application provides a range-finding apparatus 10. The range-finding apparatus 10 is applicable to the terminal system 1000. The range-finding apparatus 10 includes a transmitting module 11, an acquisition module 13, a demodulation module 14, a confidence module 15, and a calculation module 16. The transmitting module 11 may be configured to perform the steps 01 and 02. The acquisition module 13 may be configured to perform the step 03. The demodulation module 14 may be configured to perform the step 04. The confidence module 15 may be configured to perform the step 05. The calculation module 16 may be configured to perform the step 06. That is to say, the transmitting module 11 may be configured to transmit the first check code from the transmitting terminal 100 to the receiving terminal 200 by using the first communication technology. The transmitting module 11 may be further configured to transmit the modulated signal from the transmitting terminal 100 to the receiving terminal 200 by using the second communication technology, where the modulated signal carries the second check code. The acquisition module 13 may be configured to acquire the first moment at which the transmitting terminal 100 transmits the modulated signal and the second moment at which the receiving terminal 200 receives the modulated signal. The demodulation module 14 may be configured to demodulate the second check code in the modulated signal. The confidence module 15 may be configured to acquire the range-finding confidence according to the first check code and the demodulated second check code. The calculation module 16 may be configured to acquire the measured distance between the transmitting terminal 100 and the receiving terminal 200 according to the first moment, the second moment, the transmission speed of the modulated signal, and the range-finding confidence.

According to the range-finding method, the range-finding apparatus 10, and the terminal system in the implementations of this application, the measured distance between the transmitting terminal 100 and the receiving terminal 200 can be acquired without a need to return the modulated signal to the transmitting terminal 100. Compared with a reflective range-finding method, the range-finding method in this application has a higher measurement frequency when used for measuring a same distance. By means of the range-finding method in this application, more measurement data can be acquired over a same time, and data with low reliability such as error data, interference data, and abnormal data can be more easily identified from the measurement data. According to the range-finding method, the range-finding apparatus 10, and the range-finding system in the implementations of this application, the range-finding confidence is acquired according to the first check code and the second check code during range-finding. Therefore, the reliability of the measured distance can be evaluated according to the range-finding confidence, helping a user determine whether to retain the measured distance as a range-finding result. In addition, the measured distance can be acquired based on the range-finding confidence. Since the reliability of the measurement data can be evaluated based on the range-finding confidence, acquiring the measured distance based on the range-finding confidence can eliminate measurement data with low reliability. In this way, the acquired measured distance has relatively high reliability.

Further description is provided below with reference to the accompanying drawings.

Refer FIG. 1. 01: Transmitting the first check code from the transmitting terminal 100 to the receiving terminal 200 by using the first communication technology. 02: Transmitting the modulated signal from the transmitting terminal 100 to the receiving terminal 200 by using the second communication technology, where the modulated signal carries the second check code, and the first communication technology is different from the second communication technology.

The first check code and the second check code may be a parity check code, a Hamming check code, a cyclic redundancy check code, a message-digest algorithm 5 (MD5) check code, or the like, which is not limited herein. In some implementations, the range-finding method further includes modulating the second check code into a signal using the second communication technology according to a predetermined signal modulation method to acquire the modulated signal. For example, the second communication technology is an acoustic communication technology. The second check code may be modulated into an acoustic signal to acquire the modulated signal.

The first communication technology and the second communication technology are different communication technologies. Specifically, the first communication technology is used for communication interaction between the transmitting terminal 100 and the receiving terminal 200. A requirement for the first communication technology is to ensure the timeliness and stability of the signal transmission. Based on the requirement for the first communication technology, the first communication technology may be a wired communication technology such as optical fiber communication or hardware cable communication (electrical connection communication), which is not limited herein. The wired communication technology has advantages such as fast transmission, a low delay, and desirable stability. The first communication technology may alternatively be a wireless communication technology such as radio frequency communication, microwave communication (such as satellite communication), and light wave communication, which is not limited herein. Wireless communication technologies including those listed can also satisfy high timeliness and stability, and is free of limitation by a wired connection. The second communication technology used for transmission of the modulated signal, so as to calculate a straight-line distance d between the transmitting terminal 100 and the receiving terminal 200 according to a period of time from a moment at which the modulated signal is transmitted from the transmitting terminal 100 to a moment at which the modulated signal is received by the receiving terminal 200, that is, a flight time t, in combination with a flight transmission speed v of the modulated signal. Specifically, the measured distance d between the transmitting terminal 100 and the receiving terminal 200 is calculated according to a formula d=vt. Therefore, the second communication technology may be the wireless communication technology, such as the acoustic communication technology or the light wave communication technology. In this way, the modulated signal that is transmitted can fly along a straight path (a macro-angle straight line) between the transmitting terminal 100 and the receiving terminal 200, thereby calculating the measured distance d according to the flight time t of the modulated signal.

Further, in some implementations, the delay for the signal transmission by using the first communication technology is shorter than the signal transmission by using the second communication technology. Therefore, even if the transmitting terminal 100 transmits the first check code by using the first communication technology and transmits the modulated signal by using the second communication technology at the same time, the receiving terminal 200 can first receive the first check code, and then receive the modulated signal (a period of time t may be delayed since the first check code is transmitted herein, and the period of time t is required not to be shorter than a maximum delay of the first communication technology). For example, the first communication technology is the light wave communication, and the second communication technology is the acoustic communication technology. Obviously, the speed of light is greater than the speed of sound. Therefore, the delay for the signal transmission by using the first communication technology is shorter than the delay for the signal transmission by using the second communication technology. If the first check code is transmitted by using the first communication technology and the modulated signal is transmitted by using the second communication technology, the receiving terminal 200 can first receive the first check code and then receive the modulated signal.

Further, in some implementations, after the transmission of the first check code is completed, the second check code is transmitted after the delay of the period of time tx. The period of time tx is greater than or equal to the maximum delay for the first communication technology, to ensure that the receiving terminal 200 can first receive the first check code and then receive the modulated signal. In this way, no matter whether the delay for the signal transmission by using the first communication technology is shorter than the delay for the signal transmission by using the second communication technology, it can be ensured that the receiving terminal 200 can first receive the first check code first and then receive the modulated signal, as long as the maximum delay of the first communication technology is known.

In some implementations, the delay for the signal transmission by using the first communication technology and the delay for the signal transmission by using the second communication technology are extremely small and may be ignored. Therefore, the modulated signal can be transmitted by using the second communication technology at the same moment of transmitting the first check code by using the first communication technology. A transmission time and an arrival time of the first check code are used as a transmission time and an arrival time of the modulated signal.

In some implementations, the modulated signal is amplified and then transmitted from the transmitting terminal 100. In this way, the transmitted modulated signal has a relatively large power, thereby preventing the modulated signal from attenuating before arriving at the receiving terminal 200.

Figure 4:
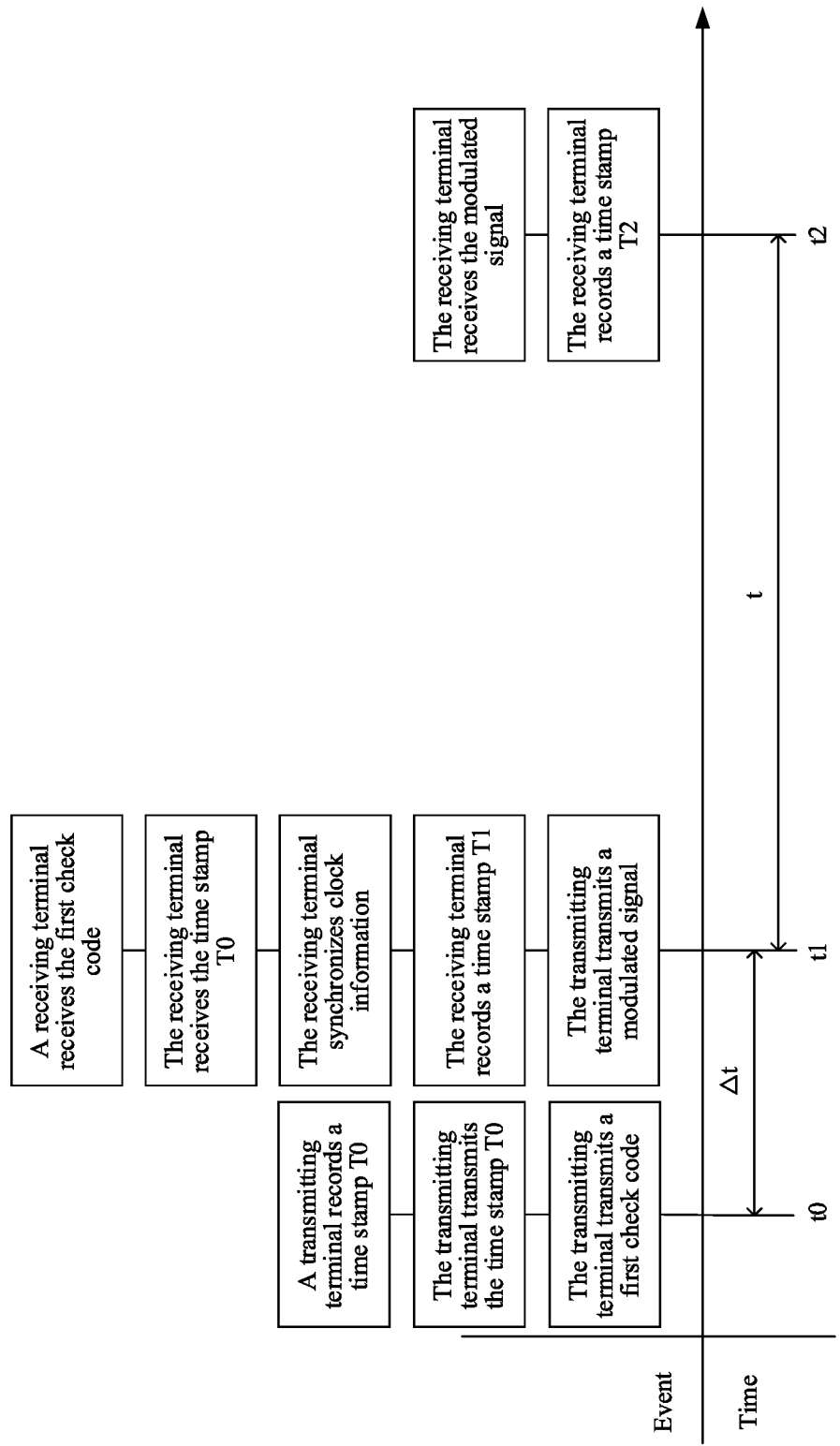
FIG. 4 is a schematic event-time axis diagram of the range-finding method according to some implementations of this application.

Refer to FIG. 1 and FIG. 4. 03: Acquiring the first moment at which the transmitting terminal 100 transmits the modulated signal and the second moment at which the receiving terminal 200 receives the modulated signal. As shown in FIG. 4, the flight time t may be determined according to the first moment t1 and the second moment t2.

The flight time t is a difference between the first moment t1 at which the transmitting terminal 100 transmits the modulated signal and the second moment t2 at which the receiving terminal 200 receives the modulated signal. That is to say, t=t2−t1.

In the reflective range-finding method, the transmitting terminal 100 is also the receiving terminal 200. Therefore, one device can record a moment at which the range-finding signal is transmitted from the device and a moment at which the device receives the range-finding signal.

In the range-finding method in this implementation of this application, the second communication technology is not used for the communication interaction between the transmitting terminal 100 and the receiving terminal 200. Therefore, the receiving terminal 200 cannot directly acquire the first moment t1 at which the transmitting terminal 100 transmits the modulated signal by using the second communication technology. Referring to FIG. 4, according to the range-finding method in this implementation of this application, the receiving terminal 200 receives the first check code and the transmitting terminal 100 transmits the modulated signal both at the first moment t1. Therefore, the first moment t1 at which the transmitting terminal 100 transmits the modulated signal is determined according to the moment at which the receiving terminal 200 receives the first check code. Specifically, after transmitting the first check code, the transmitting terminal 100 waits for a transmission delay Δt of the first check code and then transmits the modulated signal. In this way, the moment at which the receiving terminal 200 receives the first check code and the moment at which the transmitting terminal 100 transmits the modulated signal are the same. The transmission delay Δt of the first check code is a period of time from the moment at which the transmitting terminal 100 transmits the first check code to the moment at which the receiving terminal 200 receives the first check code.

Figure 5:
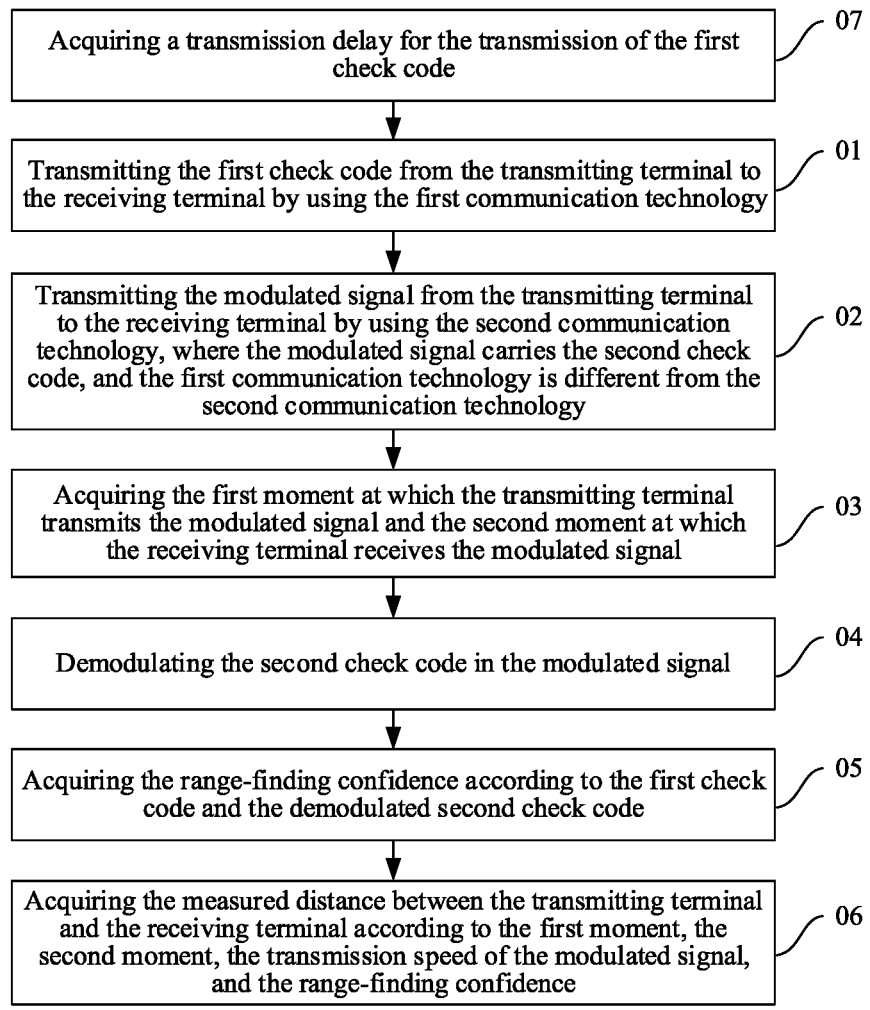
FIG. 5 is a schematic flowchart of a range-finding method according to some implementations of this application.
Figure 6:
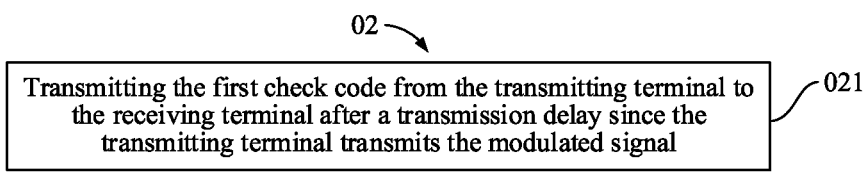
FIG. 6 is a schematic flowchart of a range-finding method according to some implementations of this application.

Specifically, referring to FIG. 5 and FIG. 6, in some implementations, the transmission delay Δt of the first check code is a fixed known quantity, that is, Δt=c, and c is a constant other than 0. The range-finding method further includes the following step: 07: Acquiring a transmission delay for the transmission of the first check code. Step 02:

transmitting the modulated signal from the transmitting terminal 100 to the receiving terminal 200 includes the following step:

021: Transmitting the first check code from the transmitting terminal 100 to the receiving terminal 200 after a transmission delay since the transmitting terminal 100 transmits the modulated signal.

Referring to FIG. 2, in some implementations, the programs further include instructions for executing the above range-finding steps 07 and 021. The processor 30 may be further configured to perform the steps 07 and 021. That is to say, the processor 30 may be further configured to transmit the first check code from the transmitting terminal 100 to the receiving terminal 200 after the transmission delay since the transmitting terminal 100 transmits the modulated signal.

Referring to FIG. 3, in some implementations, the acquisition module 13 may be further configured to perform the step 07, and the transmitting module 12 may be further configured to perform the step 021. That is to say, the acquisition module 13 may be further configured to acquire the transmission delay for the transmission of the first check code. The transmitting module 12 may be further configured to transmit the first check code from the transmitting terminal 100 to the receiving terminal 200 after the transmission delay since the transmitting terminal 100 transmits the modulated signal.

Referring to FIG. 1, FIG. 4, and FIG. 5, in an embodiment, the transmission delay Δt of the first check code may be known information pre-entered into the receiving terminal 200. In this case, the step 07 is performed before the step 01 of transmitting the first check code from the transmitting terminal 100 to the receiving terminal 200 by using the first communication technology. In another embodiment, the transmission delay Δt may alternatively be information transmitted together when the transmitting terminal 100 transmits the first check code. In this case, the step 07 and the step 01 are performed simultaneously.

Specifically, referring to FIG. 4, in an embodiment, at a $0^{th}$ moment t0, the transmitting terminal 100 transmits the first check code by using the first communication technology. After the transmission delay Δt, at the first moment t1, the transmitting terminal 100 transmits the modulated signal by using the second communication technology, and the receiving terminal 200 receives the first check code and records a time stamp T1 at which the first check code is received. At the second moment t2, the receiving terminal 200 receives the modulated signal and records a time stamp T2 at which the modulated signal is received. The time recorded in the time stamp T1 is the first moment t1, and the time recorded in the time stamp T2 is the second moment t2. When the receiving terminal 200 has acquired the moment t1 and the second moment t2, the flight time t may be calculated according to t=t2−t1.

In some implementations, the transmission delay Δt of the first check code is very small, that is, Δt≈0. Therefore, during calculation of the flight time t, the transmission delay Δt may be ignored. That is to say, the transmitting terminal 100 transmits the first check code and the receiving terminal 200 receives the first check code almost simultaneously. In this case, in order to cause the receiving terminal 200 to receive the first check code and the transmitting terminal 100 to transmit the modulated signal at the same moment, the modulated signal is required to be transmitted to the receiving terminal 200 while the transmitting terminal 100 transmits the first check code.

Figure 7:
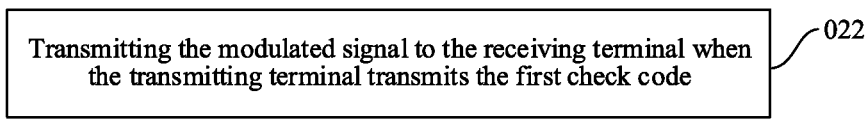
FIG. 7 is a schematic flowchart of a range-finding method according to some implementations of this application.

Specifically, referring to FIG. 7, 02 of transmitting the modulated signal from the transmitting terminal 100 to the receiving terminal 200 further includes the following step:

022: Transmitting the modulated signal to the receiving terminal 200 when the transmitting terminal 100 transmits the first check code.

Referring to FIG. 2, in some implementations, the programs further include instructions for executing the above step 022. The processor 30 may be further configured to perform the step 022. That is to say, the processor 30 may be further configured to transmit the modulated signal to the receiving terminal 200 when the transmitting terminal 100 transmits the first check code.

Referring to FIG. 3, in some implementations, the transmitting module 12 may be further configured to perform the step 022. That is to say, the transmitting module 12 may be further configured to transmit the modulated signal to the receiving terminal 200 when the transmitting terminal 100 transmits the first check code.

Referring to FIG. 4 and FIG. 7, when the transmission delay Δt may be ignored, that is, it is considered that Δt=0, the $0^{th}$ moment t0 and the first moment t1 coincide on a time axis. The transmitting terminal 100 transmits the first check code and the modulated signal simultaneously. In this case, the receiving terminal 200 may calculate the flight time t according to the first moment t1 recorded in the time stamp T1 and the second moment t2 recorded in the time stamp T2.

Figure 8:
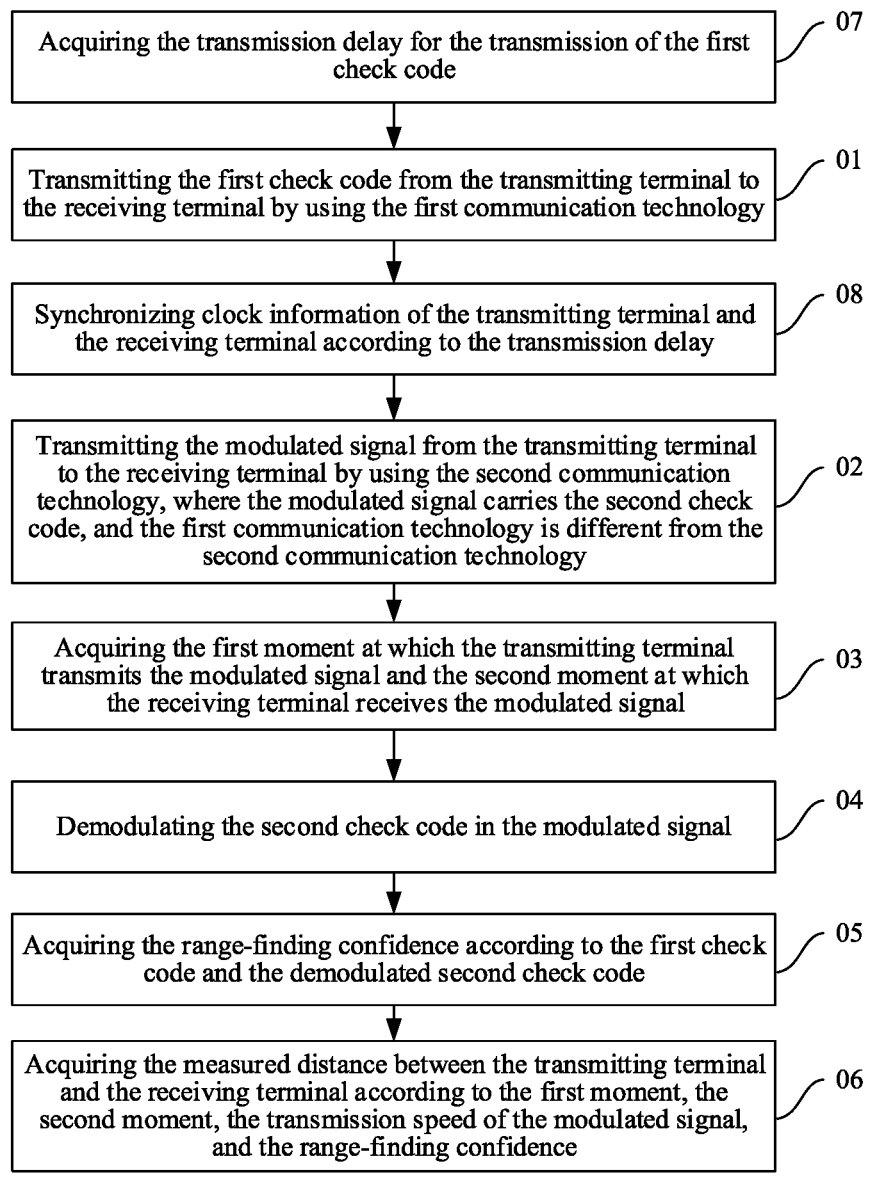
FIG. 8 is a schematic flowchart of a range-finding method according to some implementations of this application.

Further, referring to FIG. 4 and FIG. 8, in some implementations, the range-finding method further includes the following step:

08: Synchronizing the clock information of the transmitting terminal 100 and the receiving terminal 200 according to the transmission delay.

Referring to FIG. 2, in some implementations, the programs further include instructions for executing the above step 08. The processor 30 may be further configured to perform the step 08. That is to say, the processor 30 may be further configured to synchronize the clock information of the transmitting terminal 100 and the receiving terminal 200 according to the transmission delay.

Referring to FIG. 3, in some implementations, the range-finding apparatus 10 further includes a clock synchronization module 17. The clock synchronization module 17 may be configured to perform the step 08. That is to say, the clock synchronization module 17 may be configured to synchronize the clock information of the transmitting terminal 100 and the receiving terminal 200 according to the transmission delay.

Refer to FIG. 4 and FIG. 8. 08: Synchronizing the clock information of the transmitting terminal 100 and the receiving terminal 200 according to the transmission delay when the receiving terminal 200 receives the first check code. The transmission delay for the first check code may be used to synchronize the clock information of the transmitting terminal 100 and the receiving terminal 200. The clock information of the transmitting terminal 100 and the receiving terminal 200 is synchronized each time the receiving terminal 200 receives the first check code. In this way, timing errors of electronic clocks of the transmitting terminal 100 and the receiving terminal 200 as a result of different hardware structures can be reduced.

Specifically, referring to FIG. 9, in an embodiment, the transmission delay for the first check code is Δt=1 s. At the $0^{th}$ moment t0 shown in FIG. 4, a clock time of the transmitting terminal 100 (which is referred to as a transmitting terminal 100 time below) is 10: 00: 00, and a clock time of the receiving terminal 200 (which is referred to as a receiving terminal 200 time) is 10: 00: 02. At this time, the transmitting terminal 100 records the time stamp T0, where the time stamp T0 is "10: 00: 00", and transmits the first check code and time stamp T0. At the moment t1 shown in FIG. 4, the transmitting terminal 100 time is 10: 00: 01, and the receiving terminal 200 time is 10: 00: 03. At this time, the transmitting terminal 100 transmits the first check code, and the receiving terminal 200 receives the first check code and the time stamp T0, adds the transmission delay Δt to the time "10: 00: 00" recorded in the time stamp T0, so as to obtain the time "10: 00: 01", and records the time "10: 00: 01" as the time stamp T1, so as to synchronize the clock information of the transmitting terminal 100 and the receiving terminal 200. At the moment t2 shown in FIG. 4, the transmitting terminal 100 time is 10: 00: 11, and the receiving terminal 200 time is 10: 00: 11 (if the clock synchronization is not performed, the receiving terminal 200 time is 10: 00: 13). At this time, the receiving terminal 200 receives the modulated signal, and records the time stamp T2 of the receiving terminal 200. The time stamp T2 is "10: 00: 11".

After the clock synchronization, moments at which the event "the transmitting terminal 100 transmits the modulated signal" and the event "the receiving terminal 200 receives the modulated signal" are recorded in the clocks of the transmitting terminal 100 and the clock of the receiving terminal 200 respectively are the same. In this way, the first moments t1 and the second moments t2 for the transmitting terminal 100 and the receiving terminal 200 can be the same, and phase errors of the clock of the transmitting terminal 100 and the clock of the receiving terminal 200 can be eliminated.

Referring to FIG. 10, in another embodiment, the transmission delay Δt of the first check code may be ignored. In this case, the receiving terminal 200 can directly use the time recorded in the time stamp T0 as the time in the time stamp T1 to synchronize the clock information of the transmitting terminal 100 and the receiving terminal 200.

Referring to FIG. 1, in some implementations, 05: of acquiring the range-finding confidence according to the first check code and the demodulated second check code is specifically as follows. The receiving terminal 200 stores a preset check table. A correspondence between the first check code and the demodulated second check code received by the receiving terminal 200 in the check table and a degree of the correspondence may be verified to determine the range-finding confidence.

Figures 11, 12:
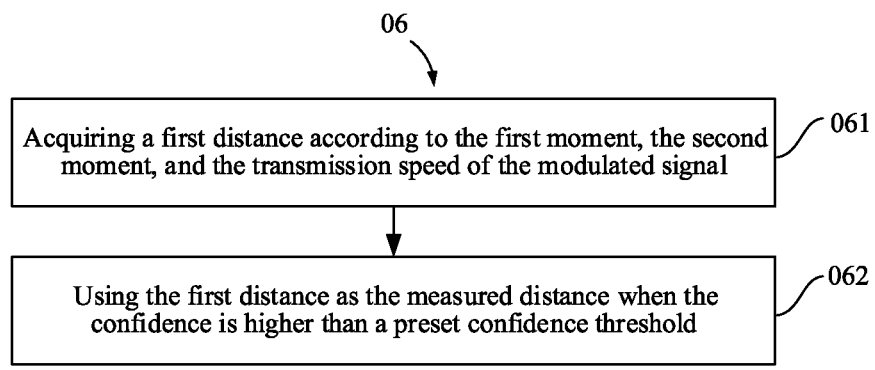
FIG. 11 is a schematic diagram of a check table of the range-finding method according to some implementations of this application.
FIG. 12 is a schematic flowchart of a range-finding method according to some implementations of this application.

Referring to FIG. 11, a 1-byte check code is used as an example. In the check table, according to the preset correspondence, when the first check code is "00001001", a corresponding second check code is "00000110". When the first check code is "00001101", the corresponding second check code is "00000010". A second check code in the check table corresponding to a first check code M1 is first found according to the first check code M1 received by the receiving terminal 200. Then a degree of correspondence between each bit of the demodulated second check code M2 and each bit of the second check code in the check table corresponding to the first check code M1 to determine the range-finding confidence. If the first check code same as the first check code M1 is not recorded in the check table, the range-finding confidence is set to 0.

For example, in a range-finding, the received first check code M1 is "00001001", and the second check code M2 obtained after receiving and demodulation is "00000111". According to the check table, it may be determined that the second check code corresponding to the first check code M1 is "00000110". The second check code M2 obtained after demodulation is "00000111". A last digit of the second check code M2 is different from that of the second check code in the check table. Therefore, a range-finding confidence corresponding to the current range-finding is A=(7/8)×100%=87.5%. In another range-finding, the received first check code M1 is "00001000". Since the first check code having the value "00001000" is not recorded in the check table, the range-finding confidence corresponding to this range-finding is A=0%.

In the embodiment shown in FIG. 11, in the check table, a preset correspondence between the first check code and the second check code is: first 4 bits are caused to have a same value, and last 4 bits are caused to have an opposite value (that is, 1 corresponds to 0, and 0 corresponds to 1). In other embodiments, the preset correspondence between the first check code and the second check code in the check table may alternatively be other correspondences. For example, all bits have a same value, or all bits have an opposite value, which is not listed herein.

In some implementations, the check table may alternatively be a waveform diagram correspondence between the first check code and the second check code. During acquisition of the range-finding confidence, the second check code in the check table corresponding to the first check code M1 is first found according to the waveform diagram of the first check code M1 received by the receiving terminal 200. Then a degree of correspondence between a waveform diagram of the demodulated second check code M2 and a waveform diagram of the second check code in the check table corresponding to the first check code M1 to determine the range-finding confidence.

The manner of acquiring the range-finding confidence according to the first check code and the demodulated second check code is not limited to the manner in the above embodiment. The range-finding confidence may be calculated by using different calculation rules according to different types of check algorithms.

In some implementations, the first check code and the second check code each include a plurality of characters. A number of the characters in the second check code is the same as a number of the characters in the first check code. The larger the number of the characters of the first check code and the second check code is, the more accurate the range-finding confidence acquired according to the first check code and the demodulated second check code is. The smaller the number of the characters of the first check code and the second check code in a same time period is, the greater number of times the range-finding can be performed and the higher the range-finding efficiency is. In this way, lengths of the first check code and the second check code can be dynamically adjusted according to a range-finding application scenario. For example, when the first check code and the second check code each include a plurality of characters, lengths of the characters are dynamically adjusted to meet requirements for accuracy of the confidence and requirements for range-finding efficiency in different application scenarios. For example, lengths of the first check code and the second check code in a scenario having relatively high requirements for an acquisition speed of the measured distance (when a UAV is becoming farther from a remote control) are respectively smaller than lengths of the first check code and the second check code in a scenario having relatively low requirements for the acquisition speed of the measured distance (when the UAV is becoming closer to the remote control).

In some implementations, a bit width for transmitting the first check code is the same as a bit width for transmitting the second check code. The bit width for transmitting the first check code and the bit width for transmitting the second check code may be dynamically adjusted during each range-finding. Since the second check code is modulated into the modulated signal for transmission, a transmission frequency of the modulated signal depends on the bit width for transmitting the second check code. The transmission frequency of the modulated signal is a range-finding frequency. Therefore, the bit width for transmitting the second check code may be dynamically adjusted according to a range-finding application scenario, so as to meet range-finding frequency requirements in different application scenarios. In addition, the bit width for transmitting the second check code may be dynamically adjusted. In this way, the anti-interference capability of the terminal system 1000 can be improved. For example, a malicious signal is transmitted to the receiving terminal 200 at a bit width of 8 bits in each range-finding period. However, the transmitting terminal 100 transmits the second check code according to a bit width rule of 8 bits, 16 bits, 16 bits, 8 bits in a plurality of range-finding periods, and the receiving terminal 200 receives the second check code according to the rule. In this way, interference of the malicious signal can be avoided to a certain extent.

In some implementations, the first check code and the second check code each include an identity character and a bit width character. The identity character is used for verification of the first check code and the second check code by using the check algorithm to acquire the range-finding confidence. The range-finding confidence depends on a degree of correspondence between the identity character of the first check code and the identity character of the second check code. The bit width character is used to determine a bit width corresponding to the check code, so as to align the identity character of the first check code to the identity character of the second check code. For example, the first check code is 123J, and the second check code is 123K. "123" in the first check code and the second check code is the identity character, "J" in the first check code and "K" in the second check code are bit width characters. The character "J" and the character "K" represent different bit widths. If the character "J" represents a bit width of 8 bits, and the character "K" represents a bit width of 16 bits, the receiving terminal 200 acquires the identity character "123" of the first check code according to the bit width of 8 bits, and acquires the identity character "123" of the second check code according to the bit width of 16 bits. Therefore, locations of the characters "1", "2", and "3" of the first check code are aligned to locations of the characters "1", "2", and "3" of the second check code during acquisition of the range-finding confidence. The identity character of the first check code and the identity character of the second check code may be the same or different. This depends on the check algorithm. The bit width character of the first check code and the bit width character of the second check code may be the same or different. This depends on whether the bit width for transmitting the first check code and the bit width for transmitting the second check code are the same. When the bit width for transmitting the first check code is different from the bit width of the transmitted second check code, the anti-interference capability of the terminal system 1000 can be further improved.

The acquired range-finding confidence is used to evaluate the reliability of the distance measured within a range-finding period. In some embodiments, a period of time between two successive transmissions of the first check code by the transmitting terminal 100 is one range-finding period.

The duration of the range-finding period may be set according to a maximum estimated measured distance. A larger maximum estimated measured distance leads to a longer flight time of the modulated signal and thereby leads to a longer time waited by the receiving terminal 200 to receive the modulated signal. Therefore, the duration of the range-finding period is longer. Conversely, when the maximum estimated measured distance is relatively short, a relatively short range-finding period may be set. In this way, the maximum measured distance can be estimated according to a range-finding application scenario. Therefore, a proper range-finding period may be set to improve the range-finding efficiency while ensuring the maximum measured distance.

In some implementations, at the ending of each range-finding period, the terminal system 1000 outputs a measured distance acquired in the range-finding period and a range-finding confidence corresponding to the measured distance. The user may determine whether to accept the data of the measured distance according to the range-finding confidence.

In some implementations, the terminal system 1000 acquires the measured distance based on the range-finding confidence. Specifically, referring to FIG. 12, step 06 of acquiring the measured distance according to the first moment, the second moment, the transmission speed of the modulated signal, and the range-finding confidence includes the following steps:

061: Acquiring a first distance according to the first moment, the second moment, and the transmission speed of the modulated signal.

062: Using the first distance as the measured distance when the confidence is higher than a preset confidence threshold.

Referring to FIG. 2, in some implementations, the programs further include instructions for executing the above steps 061 and 062. The processor 30 may be further configured to perform the steps 061 and 062. That is to say, the processor 30 may be further configured to: acquire the first distance according to the first moment, the second moment, and the transmission speed of the modulated signal; and use the first distance as the measured distance when the confidence is higher than the preset confidence threshold.

Referring to FIG. 3, in some implementations, the calculation module 16 may be further configured to perform the steps 061 and 062. That is to say, the calculation module 16 may be further configured to: acquire the first distance according to the first moment, the second moment, and the transmission speed of the modulated signal; and use the first distance as the measured distance when the confidence is higher than the preset confidence threshold.

Referring to FIG. 4 and FIG. 12, the first distance d may be calculated according to the first moment t1, the second moment t2, and the transmission speed of the modulated signal v. The first distance $d=v \times t=v \times (t2-t1)$. The range-finding confidence A may be used to evaluate reliability of the first distance d. When the range-finding confidence A corresponding to the first distance d is higher than the preset confidence threshold, the first distance d is considered as a reliable distance value. The terminal system 1000 receives the first distance d and uses the first distance d as the measured distance to be output.

Figure 13:
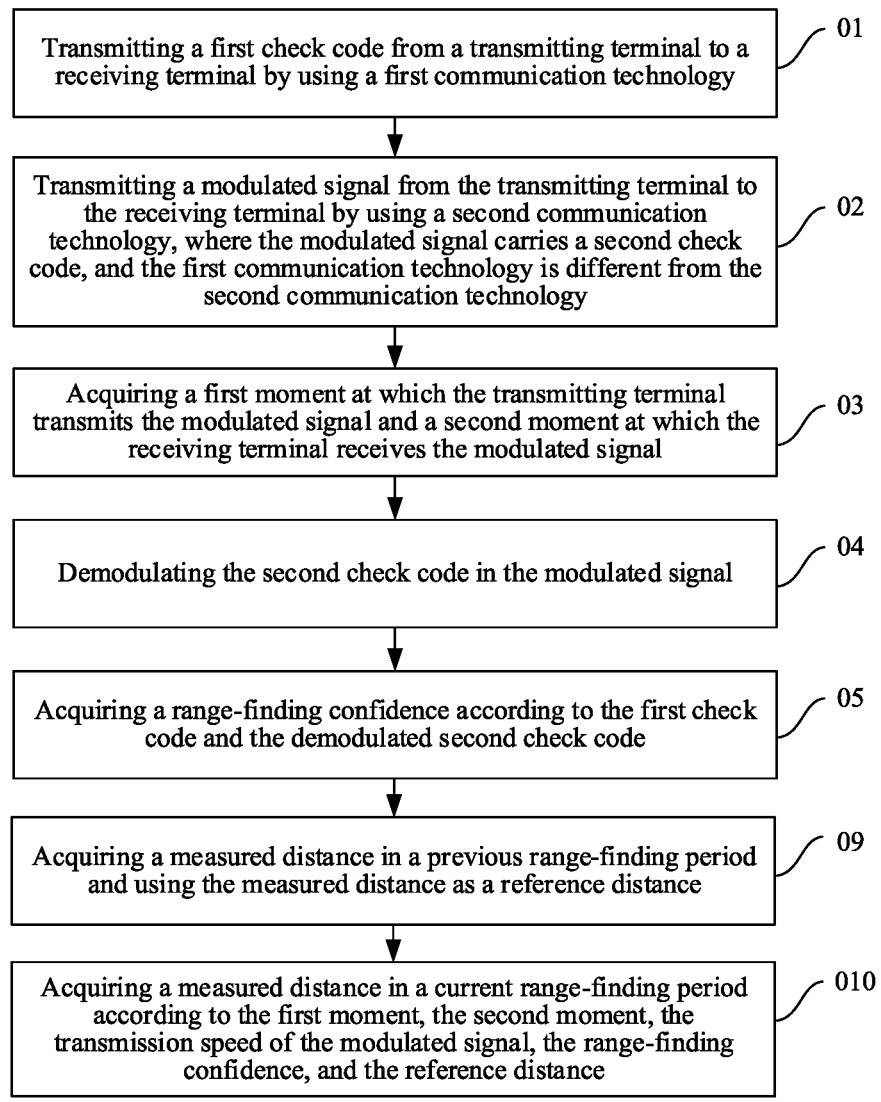
FIG. 13 is a schematic flowchart of a range-finding method according to some implementations of this application.

In some implementations, the step of transmitting the first check code from the transmitting terminal 100 to the receiving terminal 200 by using the first communication technology to the step of acquiring the measured distance between the transmitting terminal 100 and the receiving terminal 200 according to the first moment, the second moment, the transmission speed of the modulated signal, and the range-finding confidence are performed within one range-finding period. The terminal system 1000 may acquire a measured distance in a current range-finding period based on a range-finding confidence and a measured distance in a previous range-finding period. Specifically, referring to FIG. 13, the range-finding method further includes the following steps:

09: Acquiring a measured distance in a previous range-finding period and using the measured distance as a reference distance.

010: Acquiring a measured distance in a current range-finding period according to the first moment, the second moment, the transmission speed of the modulated signal, the range-finding confidence, and the reference distance.

Referring to FIG. 2, in some implementations, the programs further include instructions for executing the above range-finding steps 09 and 010. The processor 30 may be further configured to perform the steps 09 and 010. That is to say, the processor 30 may be further configured to: acquire the measured distance in the previous range-finding period and use the measured distance as the reference distance; and acquire the measured distance in the current range-finding period according to the first moment, the second moment, the transmission speed of the modulated signal, the range-finding confidence, and the reference distance.

Referring to FIG. 3, in some implementations, the acquisition module 13 may be further configured to perform the step 09, and the calculation module 16 may be further configured to perform the step 010. That is to say, the acquisition module 13 may be further configured to acquire the measured distance in the previous range-finding period and use the measured distance as the reference distance. The calculation module 16 may be further configured to acquire the measured distance in the current range-finding period according to the first moment, the second moment, the transmission speed of the modulated signal, the range-finding confidence, and the reference distance.

Figure 14:
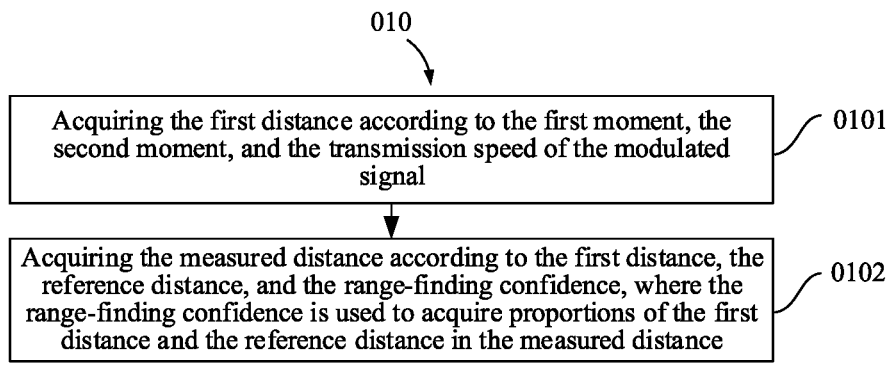
FIG. 14 is a schematic flowchart of a range-finding method according to some implementations of this application.

Specifically, referring to FIG. 14, step 010 of acquiring the measured distance in the current range-finding period according to the first moment, the second moment, the transmission speed of the modulated signal, the range-finding confidence, and the reference distance includes the following steps:

0101: Acquiring the first distance according to the first moment, the second moment, and the transmission speed of the modulated signal.

0102: Acquiring the measured distance according to the first distance, the reference distance, and the range-finding confidence, where the range-finding confidence is used to acquire proportions of the first distance and the reference distance in the measured distance.

Referring to FIG. 2, in some implementations, the programs further include instructions for executing the above range-finding steps 09 and 010. The processor 30 may be further configured to perform the steps 0101 and 0102. That is to say, the processor 30 may be further configured to: acquire the first distance according to the first moment, the second moment, and the transmission speed of the modulated signal; and acquire the measured distance according to the first distance, the reference distance, and the range-finding confidence, where the range-finding confidence is used to acquire the proportions of the first distance and the reference distance in the measured distance.

Referring to FIG. 3, in some implementations, the calculation module 16 may be further configured to perform the steps 0101 and 0102. That is to say, the calculation module 16 may be further configured to: acquire the first distance according to the first moment, the second moment, and the transmission speed of the modulated signal; and acquire the measured distance according to the first distance, the reference distance, and the range-finding confidence, where the range-finding confidence is used to acquire the proportions of the first distance and the reference distance in the measured distance.

For example, in an embodiment, relative locations of the transmitting terminal 100 and the receiving terminal 200 are fixed, or relative movement and transmission speeds of the transmitting terminal 100 and the receiving terminal 200 are relatively small. The measured distance in the previous range-finding period is d1. d1=100 m is set, and the distance d1 is used as the reference distance. Referring to FIG. 4, in the current range-finding period, the first distance d2' may be acquired according to the first moment t1, the second moment t2, and the transmission speed v of the modulated signal. d2'=v×(t2−t1). d2'=102 m is set. The range-finding confidence acquired in the current range-finding period is A2=80%. It may be determined according to the range-finding confidence A2 that the proportion of the first distance d2' in the measured distance in the current range-finding period is 80%, and the proportion of the reference distance d1 is 20%. Therefore, the measured distance in the current range-finding period is d2=d2'×A2+d1×(1−A2). By substituting d1=100 m, d2'=102 m, and A2=80% into the above formula, d2=102 m×80%+100 m×20%=101.6 m can be acquired. That is to say, the measured distance d2 in the current range-finding period is 101.6 m. Therefore, a higher range-finding confidence A2 in the current range-finding period leads to a higher distance value of the current measurement, that is, leads to a higher proportion of the value of the first distance d2' in the value of the measured distance d2 in the current range-finding period. A lower range-finding confidence A2 in the current range-finding period leads to a higher proportion of the historic measured distance value, that is, the value of the reference distance d1 in the value of the measured distance d2 in the current range-finding period. In this way, the accuracy of the measured distance d2 in the current range-finding period is ensured.

For example, in an embodiment, the relative movement and transmission speeds of the transmitting terminal 100 and the receiving terminal 200 are relatively large. The measured distance of the current range-finding period is d2=d2' A2×Q1+d1×(1−A2)×Q2. Q1 and Q2 are weights determined according to the relative movement and transmission speeds of the transmitting terminal 100 and the receiving terminal 200. Higher relative movement and transmission speeds of the transmitting terminal 100 and the receiving terminal 200 lead to larger Q1 and smaller Q2; lower relative movement and transmission speeds of the transmitting terminal 100 and the receiving terminal 200 lead to values of Q1 and Q2 more approximating 1. Further, when the relative locations of the transmitting terminal 100 and the receiving terminal 200 are fixed, the values of Q1 and Q2 are both 1.

In summary, according to the range-finding method in this implementation of this application, the transmitting terminal 100 can transmit the first check code and the modulated signal to the receiving terminal 200 by using different communication technologies, to acquire the range-finding confidence and the measured distance. Compared with the reflective range-finding method, the range-finding method in this implementation of this application has a higher measurement frequency when used for measuring a same distance. In addition, by means of the range-finding method in this implementation of this application, the acquired measured distance is ensured to be accurate and reliable in combination with the range-finding confidence.

Figure 15:
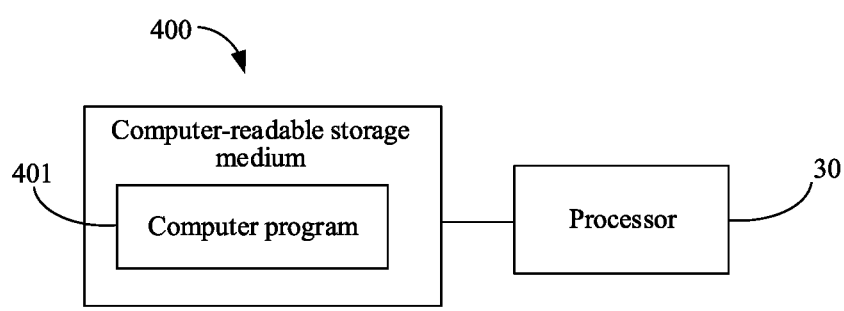
FIG. 15 is a schematic diagram of a connection status between a computer-readable storage medium and a processor according to some implementations of this application.

Referring to FIG. 15, an implementation of this application further provides a non-transitory computer-readable storage medium 400 including a computer program 401. The computer program 401, when executed by one or more processors 30, causes the one or more processors 30 to perform the range-finding method in any of the above implementations. The non-transitory computer-readable storage medium 400 may be disposed in the terminal system 1000, or may be disposed in a cloud server or other apparatuses. In this case, the terminal system 1000 may communicate with the cloud server or the other apparatuses to acquire the corresponding computer program 410.

Referring to FIG. 2, for example, the computer program 401, when executed by one or more processors 30, causes the one or more processors 30 to perform the steps 01, 02, 03, 04, 05, 06, 07, 08, 09, 010, 021, 022, 061, 062, 0101, and 0102. For example, the one or more processors perform the following application range-finding method.

01: Transmitting the first check code from the transmitting terminal 100 to the receiving terminal 200 by using the first communication technology.

02: Transmitting a modulated signal from the transmitting terminal 100 to the receiving terminal 200 by using a second communication technology, where the modulated signal carries a second check code, and the first communication technology is different from the second communication technology.

03: Acquiring the first moment at which the transmitting terminal 100 transmits the modulated signal and the second moment at which the receiving terminal 200 receives the modulated signal;

04: Demodulating the second check code in the modulated signal.

05: Acquiring the range-finding confidence according to the first check code and the demodulated second check code.

06: Acquiring the measured distance between the transmitting terminal 100 and the receiving terminal 200 according to the first moment, the second moment, the transmission speed of the modulated signal, and the range-finding confidence.

In another example, the computer program 401, when executed by one or more processors 30, causes the one or more processors 30 to perform the following range-finding method.

01: Transmitting the first check code from the transmitting terminal 100 to the receiving terminal 200 by using the first communication technology.

07: Acquiring the transmission delay for the transmission of the first check code.

08: Synchronizing the clock information of the transmitting terminal 100 and the receiving terminal 200 according to the transmission.

02: Transmitting the modulated signal from the transmitting terminal 100 to the receiving terminal 200 by using the second communication technology, where the modulated signal carries the second check code, and the first communication technology is different from the second communication technology.

03: Acquiring the first moment at which the transmitting terminal 100 transmits the modulated signal and the second moment at which the receiving terminal 200 receives the modulated signal;

04: Demodulating the second check code in the modulated signal.

05: Acquiring the range-finding confidence according to the first check code and the demodulated second check code.

09: Acquiring the measured distance in the previous range-finding period and using the measured distance as the reference distance.

010: Acquiring the measured distance in the current range-finding period according to the first moment, the second moment, the transmission speed of the modulated signal, the range-finding confidence, and the reference distance.

In the description of this specification, the description of the reference terms such as "some implementations", "in an example", and "exemplarily" mean that specific features, structures, materials, or characteristics described in combination with the implementations or examples is included in at least one implementation or example of this application. In this specification, schematic descriptions of the foregoing terms are not necessarily with respect to the same implementation or example. In addition, the described specific characteristics, structures, materials, or features may be combined in a proper manner in any one or more implementations or examples. In addition, different embodiments or examples described in this specification, as well as features of different embodiments or examples, may be integrated and combined by a person skilled in the art without contradicting each other.

Any process or method in the flowcharts or described herein in another manner may be understood as indicating a module, a segment, or a part including code of one or more executable instructions for implementing a particular logical function or process step. In addition, the scope of preferred embodiments of this application includes other implementations which do not follow the order shown or discussed, including performing, according to involved functions, the functions basically simultaneously or in a reverse order, which should be understood by technical personnel in the technical field to which the embodiments of this application belong.

Although the implementations of this application have been shown and described above, it should be understood that the above implementations are exemplary and should not be construed as a limitation on this application. A person skilled in the art may make changes, modifications, replacements and variations to the above implementations within the scope of this application.

What is claimed is:

1. A range-finding method, comprising:
   transmitting a first check code from a transmitting terminal to a receiving terminal by using a first communication technology;
   transmitting a modulated signal from the transmitting terminal to the receiving terminal by using a second communication technology, wherein the modulated signal carries a second check code, and the first communication technology is different from the second communication technology;
   acquiring a first moment at which the transmitting terminal transmits the modulated signal and a second moment at which the receiving terminal receives the modulated signal;
   demodulating the second check code in the modulated signal;
   acquiring a range-finding confidence according to the first check code and the demodulated second check code; and acquiring a measured distance between the transmitting terminal and the receiving terminal according to the first moment, the second moment, a transmission speed of the modulated signal, and the range-finding confidence;

wherein the first communication technology is a light wave communication technology; and wherein the second communication technology is an acoustic communication technology.

2. The range-finding method according to claim 1, wherein a delay for signal transmission by using the first communication technology is shorter than a delay for signal transmission by using the second communication technology.

3. The range-finding method according to claim 1, further comprising:

acquiring a transmission delay for the transmission of the first check code; and synchronizing clock information of the transmitting terminal and the receiving terminal according to the transmission delay.

4. The range-finding method according to claim 1, wherein the step of transmitting a modulated signal from the transmitting terminal to the receiving terminal comprises:

transmitting the modulated signal to the receiving terminal when the transmitting terminal transmits the first check code; or transmitting the first check code from the transmitting terminal to the receiving terminal after a transmission delay since the transmitting terminal transmits the modulated signal.

5. The range-finding method according to claim 1, wherein the step of acquiring a measured distance according to the first moment, the second moment, a transmission speed of the modulated signal, and the range-finding confidence comprises:

acquiring a first distance according to the first moment, the second moment, and the transmission speed of the modulated signal; and using the first distance as the measured distance when the confidence is higher than a preset confidence threshold.

6. The range-finding method according to claim 1, wherein the step of transmitting the first check code from the transmitting terminal to the receiving terminal by using the first communication technology to the step of acquiring the measured distance between the transmitting terminal and the receiving terminal according to the first moment, the second moment, the transmission speed of the modulated signal, and the range-finding confidence are performed within one range-finding period, and the range-finding method further comprises:

acquiring a measured distance in a previous range-finding period and using the measured distance as a reference distance; and acquiring a measured distance in a current range-finding period according to the first moment, the second moment, the transmission speed of the modulated signal, the range-finding confidence, and the reference distance.

7. The range-finding method according to claim 6, wherein the step of acquiring a measured distance in a current range-finding period according to the first moment, the second moment, the transmission speed of the modulated signal, the range-finding confidence, and the reference distance comprises:

acquiring a first distance according to the first moment, the second moment, and the transmission speed of the modulated signal; and acquiring the measured distance according to the first distance, the reference distance, and the range-finding confidence, wherein the range-finding confidence is used to acquire proportions of the first distance and the reference distance in the measured distance.

8. A range-finding apparatus, comprising:

a transmitting module, configured to transmit a first check code from a transmitting terminal to a receiving terminal by using a first communication technology; and transmit a modulated signal from the transmitting terminal to the receiving terminal by using a second communication technology, wherein the modulated signal carries a second check code, and the first communication technology is different from the second communication technology;

an acquisition module, configured to acquire a first moment at which the transmitting terminal transmits the modulated signal and a second moment at which the receiving terminal receives the modulated signal;

a demodulation module, configured to demodulate the second check code in the modulated signal;

a confidence module, configured to acquire a range-finding confidence according to the first check code and the demodulated second check code; and a calculation module, configured to acquire a measured distance between the transmitting terminal and the receiving terminal according to the first moment, the second moment, a transmission speed of the modulated signal, and the range-finding confidence;

wherein the first communication technology is a light wave communication technology; and wherein the second communication technology is an acoustic communication technology.

9. A terminal system, comprising:

a transmitting terminal;

a receiving terminal;

one or more processors and a memory; and one or more programs, stored in the memory and executable by the one or more processors, wherein the programs comprise instructions for performing a range-finding method comprising:

transmitting a first check code from a transmitting terminal to a receiving terminal by using a first communication technology;

transmitting a modulated signal from the transmitting terminal to the receiving terminal by using a second communication technology, wherein the modulated signal carries a second check code, and the first communication technology is different from the second communication technology;

acquiring a first moment at which the transmitting terminal transmits the modulated signal and a second moment at which the receiving terminal receives the modulated signal;

demodulating the second check code in the modulated signal;

acquiring a range-finding confidence according to the first check code and the demodulated second check code; and acquiring a measured distance between the transmitting terminal and the receiving terminal according to the first moment, the second moment, a transmission speed of the modulated signal, and the range-finding confidence;

wherein the first communication technology is a light wave communication technology; and wherein the second communication technology is an acoustic communication technology.

10. The terminal system according to claim 9, wherein a delay for signal transmission by using the first communication technology is shorter than a delay for signal transmission by using the second communication technology.

11. The terminal system according to claim 9, wherein the range-finding method further comprises:

acquiring a transmission delay for the transmission of the first check code; and synchronizing clock information of the transmitting terminal and the receiving terminal according to the transmission delay.

12. The terminal system according to claim 9, wherein the step of transmitting a modulated signal from the transmitting terminal to the receiving terminal comprises:

transmitting the modulated signal to the receiving terminal when the transmitting terminal transmits the first check code; or transmitting the first check code from the transmitting terminal to the receiving terminal after a transmission delay since the transmitting terminal transmits the modulated signal.

13. The terminal system according to claim 9, wherein the step of acquiring a measured distance according to the first moment, the second moment, a transmission speed of the modulated signal, and the range-finding confidence comprises:

acquiring a first distance according to the first moment, the second moment, and the transmission speed of the modulated signal; and using the first distance as the measured distance when the confidence is higher than a preset confidence threshold.

14. The terminal system according to claim 9, wherein the step of transmitting the first check code from the transmitting terminal to the receiving terminal by using the first communication technology to the step of acquiring the measured distance between the transmitting terminal and the receiving terminal according to the first moment, the second moment, the transmission speed of the modulated signal, and the range-finding confidence are performed within one range-finding period, and the range-finding method further comprises:

acquiring a measured distance in a previous range-finding period and using the measured distance as a reference distance; and acquiring a measured distance in a current range-finding period according to the first moment, the second moment, the transmission speed of the modulated signal, the range-finding confidence, and the reference distance.

15. The terminal system according to claim 14, wherein the step of acquiring a measured distance in a current range-finding period according to the first moment, the second moment, the transmission speed of the modulated signal, the range-finding confidence, and the reference distance comprises:

acquiring a first distance according to the first moment, the second moment, and the transmission speed of the modulated signal; and acquiring the measured distance according to the first distance, the reference distance, and the range-finding confidence, wherein the range-finding confidence is used to acquire proportions of the first distance and the reference distance in the measured distance.

16. A non-transitory computer-readable storage medium, storing a computer program, wherein the computer program, when executed by one or more processors, implements a range-finding method comprising:

transmitting a first check code from a transmitting terminal to a receiving terminal by using a first communication technology;

transmitting a modulated signal from the transmitting terminal to the receiving terminal by using a second communication technology, wherein the modulated signal carries a second check code, and the first communication technology is different from the second communication technology;

acquiring a first moment at which the transmitting terminal transmits the modulated signal and a second moment at which the receiving terminal receives the modulated signal;

demodulating the second check code in the modulated signal;

acquiring a range-finding confidence according to the first check code and the demodulated second check code; and acquiring a measured distance between the transmitting terminal and the receiving terminal according to the first moment, the second moment, a transmission speed of the modulated signal, and the range-finding confidence;

wherein the first communication technology is a light wave communication technology; and wherein the second communication technology is an acoustic communication technology.

17. The non-transitory computer-readable storage medium according to claim 16, wherein a delay for signal transmission by using the first communication technology is shorter than a delay for signal transmission by using the second communication technology.

18. The non-transitory computer-readable storage medium according to claim 16, wherein the range-finding method further comprises:

acquiring a transmission delay for the transmission of the first check code; and synchronizing clock information of the transmitting terminal and the receiving terminal according to the transmission delay.

19. The non-transitory computer-readable storage medium according to claim 16, wherein the step of transmitting a modulated signal from the transmitting terminal to the receiving terminal comprises:

transmitting the modulated signal to the receiving terminal when the transmitting terminal transmits the first check code; or transmitting the first check code from the transmitting terminal to the receiving terminal after a transmission delay since the transmitting terminal transmits the modulated signal.

20. The non-transitory computer-readable storage medium according to claim 16, wherein the step of acquiring a measured distance according to the first moment, the second moment, a transmission speed of the modulated signal, and the range-finding confidence comprises:

acquiring a first distance according to the first moment, the second moment, and the transmission speed of the modulated signal; and using the first distance as the measured distance when the confidence is higher than a preset confidence threshold.

21. The non-transitory computer-readable storage medium according to claim 16, wherein the step of transmitting the first check code from the transmitting terminal to the receiving terminal by using the first communication technology to the step of acquiring the measured distance between the transmitting terminal and the receiving terminal according to the first moment, the second moment, the transmission speed of the modulated signal, and the range-finding confidence are performed within one range-finding period, and the range-finding method further comprises:
  acquiring a measured distance in a previous range-finding period and using the measured distance as a reference distance; and
  acquiring a measured distance in a current range-finding period according to the first moment, the second moment, the transmission speed of the modulated signal, the range-finding confidence, and the reference distance.

22. The non-transitory computer-readable storage medium according to claim 21, wherein the step of acquiring a measured distance in a current range-finding period according to the first moment, the second moment, the transmission speed of the modulated signal, the range-finding confidence, and the reference distance comprises:
  acquiring a first distance according to the first moment, the second moment, and the transmission speed of the modulated signal; and
  acquiring the measured distance according to the first distance, the reference distance, and the range-finding confidence, wherein the range-finding confidence is used to acquire proportions of the first distance and the reference distance in the measured distance.

* * * * *